US006205206B1

(12) United States Patent
Hersh et al.

(10) Patent No.: US 6,205,206 B1
(45) Date of Patent: Mar. 20, 2001

(54) INTEGRATING A VOICE MESSAGING FUNCTION CARD OVER A PUBLIC BRANCH EXCHANGE (PBX) BACKPLANE

(75) Inventors: Israel J. Hersh, Fairfield; Frank Tanski, Stamford, both of CT (US)

(73) Assignee: Inter-Tel, Inc., Chandler, AZ (US)

( * ) Notice: Subject to any disclaimer, the term of this patent is extended or adjusted under 35 U.S.C. 154(b) by 0 days.

(21) Appl. No.: 09/046,913

(22) Filed: Mar. 24, 1998

(51) Int. Cl.[7] .................................................. H04M 1/64
(52) U.S. Cl. ................................ 379/88.26; 379/93.07
(58) Field of Search ........................... 379/88.07, 88.28, 379/88.26, 93.07, 74; 710/129

(56) References Cited

U.S. PATENT DOCUMENTS

| 5,046,188 | * | 9/1991 | Molnar | 379/93.07 |
| 5,329,579 | * | 7/1994 | Brunson | 379/88.26 |
| 5,519,766 | * | 5/1996 | Jones | 379/74 |
| 5,928,347 | * | 7/1999 | Jones | 710/129 |

* cited by examiner

Primary Examiner—David D. Knepper
(74) Attorney, Agent, or Firm—Dilworth & Barrese, LLP

(57) ABSTRACT

The voice mail system is embodied on a card (VxC) designed to be inserted into the PBX cabinet and communicate with the PBX processor via the backplane of the system. The VxC card includes a dual port RAM for providing two way communication between the VxC and the PBX. Through the allocation of memory areas, and control commands corresponding to the respective allocated areas, the PBX processor and VxC can communicate via the dual port RAM interface over the PBX backplane. The use of the dual port RAM communication over the PBX backplane eliminates the need for asynchronous RS-232 signaling to establish control and implement voice mail functions to a PBX system.

18 Claims, 3 Drawing Sheets

INTEGRATING A VOICE MESSAGING FUNCTION CARD OVER A PUBLIC BRANCH EXCHANGE (PBX) BACKPLANE

BACKGROUND OF THE INVENTION

1. Field of the Invention

The present invention relates to voice messaging systems, and more particularly, to a method for integrating a voice messaging system card (VxC) with a PBX.

2. Prior Art

The VXII Voice Mail System developed by Executone Information Systems and implemented in a line of PBX systems (i.e., integrated digital system (IDS)), has the capability of exchanging control signals through both in-band signals using DTMF tones, and through the use of asynchronous RS-232 communications. While the RS-232 signaling does not replace all of the functionality of the in-band signaling, the use of the RS-232 signaling eliminates the requirement that the IDS provide DTMF receivers for each of the serial line interface (SLI) ports connected to the VXII.

With the development of the VxC card and its first uses, it requires the use of an IDS serial port and an external cable connecting the VxC to the IDS CPU. Additionally, an external monitor and keyboard are required for the programming and monitoring of the operation of the VxC. All of these additional components increase the cost of providing voice mail to low end systems.

The voice card operates on a DOS platform, and generally uses a memory manager for efficiently using memory locations contained within the operating environment. QEMM is one type of memory manager that has been used. However, its use requires royalty payments to Quarter Deck, and is therefore not desirable in the present invention.

In previous implementations of the VxC card, a dual port RAM of the card acted as if it were an OPX card, and the RS-232 connector on the VxC card was connected to a serial port on the IDS. A keyboard and monitor were attached to the keyboard and VGA connectors respectively. With this configuration, the VxC card could operate within an existing IDS without requiring any code changes on the IDS.

SUMMARY OF THE INVENTION

It is an object of the present invention to provide a method for integrating a voice mail system into lower end PBX systems with a reduced cost.

It is another object of the present invention to provide a method for integrating a voice mail system into a PBX that eliminate the use of RS-232 asynchronous signaling to provide control of the voice mail system.

It is yet another object of the invention to provide a method for integrating a voice mail system into a PBX that eliminates the need for an external monitor and keyboard.

These and other objects of the invention are realized in one embodiment thereof by providing a method for integrating a voice mail/messaging system into the backplane of a public branch exchange (PBX) telephone system comprising the steps of: providing a voice messaging card (VxC) for connection to the backplane of the PBX system; dedicating a random access memory (RAM) on said voice messaging card for communicating with the PBX via the PBX backplane; establishing two-way communication between the voice messaging card and the PBX over the backplane; and controlling the voice messaging card to provide voice mail functions to the users of the PBX telephone system.

Connection over the dual port RAM take precidence over other previous know connections. Although programming through the use of the RS-232 and external cable will not be entirely disabled, it will be ignored when the dual port RAM configuration is recognized and initialized.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

Acronyms and Abbreviations

DPR: Dual Port RAM is a 1K Byte RAM area resident on the VxC card and is simultaneously accessible from both the IDS and the VxC processors.

IDS: Integrated Digital System is the name for a line of PBX's developed by Executone Information Systems Inc.

IOT: Integrated Operator Terminal is a terminal made by Wyse, which is use as an operator's station, to configure the IDS and to view the status of the system.

VxC is a single card used for the providing voice mail functionality in a PBX voice messaging system.

VXII is the name for the voice mail product developed by A+ systems and sold by Executone Information Systems, Inc.

VMI: Voice Mail Integration provides the use of an RS-232 interface between an IDS and the VXII voice mail.

Figure 1:
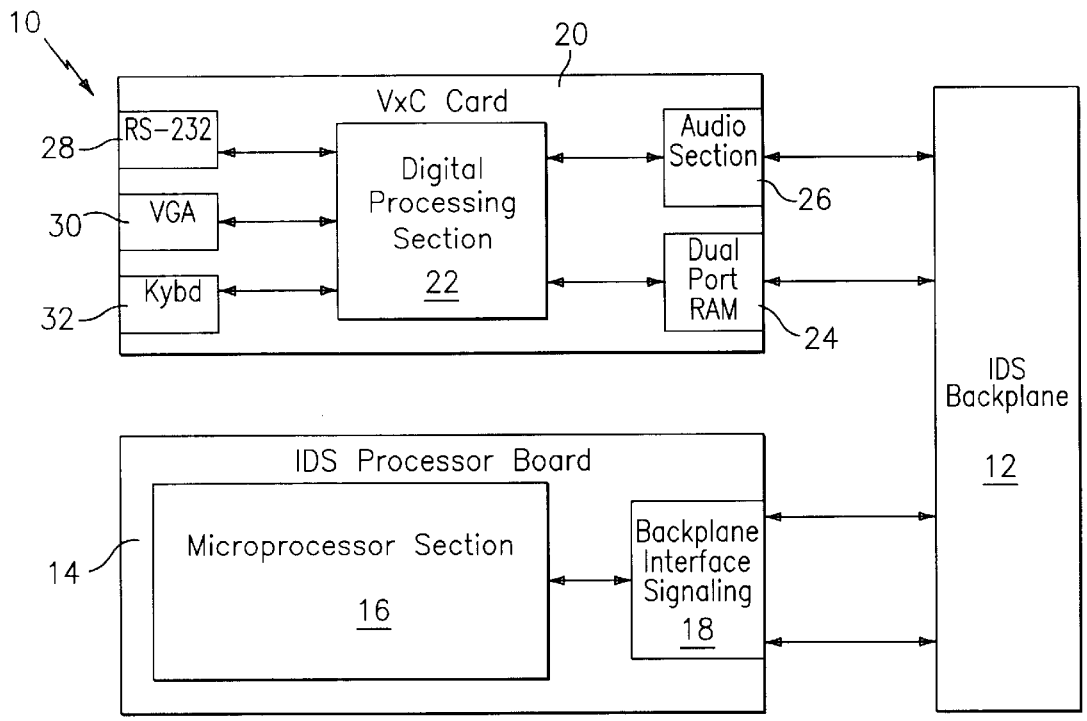
FIG. 1 is a block diagram of the hardware architecture of the integration of the VxC card to the IDS backplane according to an embodiment of the invention.

Referring to FIG. 1, a top level view 10 of the integration of a VxC card 20 in an IDS is shown. The microprocessor section 16 of the IDS processor board 14 has access to each of the cards in the backplane. For those cards that do not have a processor, the IDS can access a number of registers to control the operation of the card. For a card that has an onboard microprocessor, such as, for example, VxC card 20, the IDS processor 14 communicates to the board via a 1K byte dual port RAM (DPR) 24.

The VxC card includes a digital processing section 22, an RS-232 communications port 28, a video display port 30, and a keyboard port 32 which are all in communication with digital processing section 22. Digital processing section 22 can be, for example, an INTEL 386 processor with support circuitry, and also includes a hard drive for storage and DSP technology for audio signal processing. In addition, a dual port RAM 24 and an audio section 26 are in communication with the IDS backplane 12 and digital processing section 22.

The IDS processor board 14 includes a microprocessor section 16 and a backplane signaling interface 18. Through this configuration, all digital signaling generated by the VxC card are sent to the IDS processor 14 via DPR 24. This effectively frees RS-232 connector 28 on VxC Card 20 and the serial port on IDS backplane 12 previously used to connect the backplane to the RS-232 connector of the VxC card. By freeing RS-232 connector 28, the programming and control of VxC card 20 can be accomplished using a computer running CO-SESSIONS connected to the RS-232 jack. This eliminates the need for a monitor and keyboard connected to the VxC card.

The VxC card 20 has been designed to work in the IDS system. The dimensions and signaling mimic that used by standard IDS port cards. For Executone Information Systems' System 84, the VxC card will fit into either one of the two 228-type port card slots in the backplane. For Executone Information Systems' 108- and 228 cabinets, the VxC will fit into any one of the slots used for 228-type port cards. Only one VxC can be used in an IDS.

Figure 2:
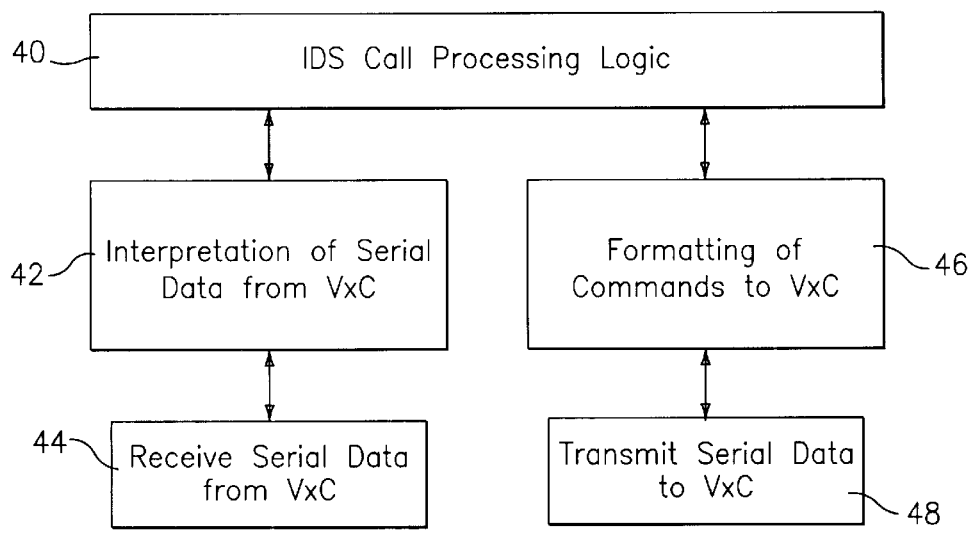
FIG. 2 is a block diagram of the software architecture for the integration of the VxC card to the IDS backplane according to an embodiment of the invention.

FIG. 2 represents the software processing for a voice mail system using the integrated VxC card according to an illustrative embodiment of the present invention. For purposes of this discussion, only the serial data connection to the VxC card (voice mail) is described. There is a low level interface in the IDS which communicates directly with the VxC. The serial data received 44 from the VxC is interpreted 42, and the interpreted commands are applied to the IDS call processing logic 40. Likewise, commands from the IDS call processing logic 40 are converted or formatted 46 to a format that is acceptable to the VxC (i.e., voice mail system) and are transmitted 48 using the low level serial interface.

The integration of VxC 20 via the IDS backplane 12 replaces the currently used asynchronous serial interface using the RS-232 port with a parallel interface via the dual port RAM 24. The use of a parallel interface as opposed to a serial one tends to increase the speed of the data communication between the connected elements.

VxC Dual Port RAM Interface

The following describes the interface between the VxC card 20 and the IDS backplane 12 via Dual Port RAM 24. Referring to FIG. 1 and table 1, from the VxC card perspective, all locations in DPR 24 are arranged as consecutive bytes, and from the IDS backplane perspective, only the odd addresses locations contain information as shown in table 1.

TABLE 1

| ADDRESS | Even Address 0 | Odd Address 1 |
|---|---|---|
| Base + 0x00 | xxxxxxxx | Card ID |
| Base + 0x02 | xxxxxxxx | Line Status |
| Base + 0x04 | xxxxxxxx | xxxxxxxx |
| Base + 0x06 | xxxxxxxx | xxxxxxxx |
| Base + 0x08 | xxxxxxxx | xxxxxxxx |
| Base + 0x0A | xxxxxxxx | xxxxxxxx |
| Base + 0x0C | xxxxxxxx | xxxxxxxx |
| Base + 0x0E | xxxxxxxx | xxxxxxxx |
| Base + 0x10 | xxxxxxxx | xxxxxxxx |
| Base + 0x12 | xxxxxxxx | xxxxxxxx |
| Base + 0x14 | xxxxxxxx | xxxxxxxx |
| Base + 0x16 | xxxxxxxx | xxxxxxxx |
| Base + 0x18 | xxxxxxxx | xxxxxxxx |
| Base + 0x1A | xxxxxxxx | xxxxxxxx |
| Base + 0x1C | xxxxxxxx | xxxxxxxx |
| Base + 0x1E | xxxxxxxx | xxxxxxxx |
| Base + 0x20 | xxxxxxxx | Driver Version String - MSB |
| Base + 0x22 | xxxxxxxx | Driver Version String |
| Base + 0x24 | xxxxxxxx | Driver Version String |
| Base + 0x26 | xxxxxxxx | Driver Version String |
| Base + 0x28 | xxxxxxxx | Driver Version String |
| Base + 0x2A | xxxxxxxx | Driver Version String |
| Base + 0x2C | xxxxxxxx | Driver Version String |

TABLE 1-continued

| ADDRESS | Even Address 0 | Odd Address 1 |
|---|---|---|
| Base + 0x2E | xxxxxxxx | Driver Version String - LSB |
| Base + 0x30 | xxxxxxxx | VXII Application Version String - MSB |
| Base + . . . | xxxxxxxx | . . . |

Table 1 is a partial representation of the allocation of offsets and respective addresses as seen by the IDS and VxC.

TABLE 2

| | Data | Offset from Base | Address on PC |
|---|---|---|---|
| 1 | Card ID | 0x00 | 0xD0004400 |
| 2 | Line Status Register | 0x01 | 0xD0004401 |
| 3 | Driver Version String | 0x10 | 0xD0004410 |
| 4 | VXII application Version String | 0x18 | 0xD0004418 |
| 5 | IDS Software Version String | 0x20 | 0xD0004420 |
| 6 | VMI Serial Data from IDS to PC | 0x40 | 0xD0004440 |
| 7 | VMI Serial Data from PC to IDS | 0xC0 | 0xD00044C0 |
| 8 | Keyboard Serial Data from IDS to PC | 0x140 | 0xD0004540 |
| 9 | Video Serial Data from PC to IDS | 0x1C0 | 0xD00045C0 |
| 10 | Report Serial Data from PC to IDS | 0x240 | 0xD0004640 |
| 11 | IDS Command to VxC | 0x2C0 | 0xD00046C0 |
| 12 | VxC Response to IDS | 0x2C4 | 0xD00046C4 |

The Card ID is located at offset 0 and is placed by the driver on startup. All cards default to 8 port OPX Card ID=7. The Line Status register is located at offset 0x01 and is bit mapped (bit 0=channel 1, bit 7=channel 8; 0=offhook, 1=onhook). The Driver Version String is an ASCIIZ string up to 8 bytes starting at offset 0x10, the first character is 'V' and the last character is 0. The IDS must detect this string and put its version label string at offset 0x20. The IDS version string is an ASCIIZ string starting with a 'V' and ending with a 0. Once the VXII application detects the IDS version string, it will route all VMI integration through the DPR instead of the serial port. The VXII Version String, placed by the VXII application, is an ASCIIZ string up to 8 bytes starting at offset 0x18. The first character is a 'V' and the last character is 0. The IDS Version String is an ASCIIZ string up to 32 bytes starting at offset 0x20, and the first character is a 'V' and the last character is a 0.

The IDS to VxC VMI is located from 0x40 to 0xBF, and is the data area allocated from the IDS to the computer for VMI integration. The 128 bytes are treated as a circular buffer with the TO/FROM pointers maintained by the IDS and the VxC, respectively. A more descriptive explanation of the circular buffer will be discussed later. The VxC to IDS VMI is located from 0xC0 to 0x13F, and is the data area allocated from the computer to the IDS for VMI integration. The 128 bytes are also treated as a circular buffer with the TO/FROM pointers maintained by the VxC and the IDS respectively.

The IDS to VxC keyboard is located from 0x140 to 0x1BF, which is the data area allocated from the IDS to the computer for keyboard information. The 128 bytes are treated as a circular buffer with the TO/FROM pointers maintained by the IDS and the VxC respectively. The data will be sent directly from the IDS terminal keyboard to the VxC buffer. The VxC to IDS video is located from 0x1c0 to 0x23F, which is the data area allocated from the computer to the IDS for the video information. The 128 bytes are treated as a circular buffer with the TO/FROM pointers maintained by the VxC and the IDS, respectively. The output must be compatible with the IDS terminal, and the screen handling capabilities of the IDS terminal are a subset of a Televideo 925 terminal capabilities.

The VxC to IDS report information is located from 0x240 to 0x2BF, which is the data area allocated from the computer to the IDS for report information. The 128 bytes are treated as a circular buffer with the TO/FROM pointers maintained by the VxC and the IDS respectively. The data contains the information which will be sent out the preselected IDS printer port. The data must be compatible with the printer which is attached to the IDS port. Notification of the start and end of a printing session from the VxC to the IDS will be sent via the VMI interface.

The IDS commands to the VxC are located from 0x2C0 to 0x2C3 which is the data area reserved for these commands. Initially, only one (1) byte of the three (3) for commands is used. A non-zero value indicates a command. The VxC will read the command and subsequently zero-out the location. At this point, the IDS can send another command.

The VxC responses to the IDS are located from 0x2C4 to 0x2C7, which is the data area reserved for these responses. Initially, only one (1) byte of the three (3) for commands is used. A non-zero value indicates a command. The IDS will read the command and subsequently zero-out the location. At this point, the VxC can send another response.

Circular Buffer Usage

There are five (5) 128 byte buffers used as circular buffers for the data between the IDS and the VxC. The TO/FROM pointers are maintained separately by each of the applications. The method essentially uses in-band signaling to verify read/write availability (zero is used for signaling). The details are as follows:

On power up, the VxC will zero out all of the circular buffers before the VxC loads its Driver Version String.

The IDS will locally maintain its TO/FROM pointers. Likewise, the VxC will maintain its own TO/FROM pointers. After a program reset, both the IDS and the VxC will reset their respective pointers.

When the IDS wants to send a character to the VxC, the IDS will check the next available location. If that location contains a zero, the IDS will put the character into that location and increment its pointer modulo buffer size. The VxC will check the next available location. If that location contains a zero, there is no work to do. If the location contains a non-zero value, the VxC copies the value to some local storage, puts a zero into the location, and increments its pointer to modulo buffer size.

The same scheme is followed in the opposite direction, when the VxC wants to send character(s) to the IDS. Since each buffer occupies 128 bytes, the entire buffer could be loaded in either direction before the receiving processor has the opportunity to unload the data.

This method uses in-band signaling to verify read/write availability (zero is used for signaling). There are no problems associated with simultaneous access to the 128 byte buffer because the 2 sides are never writing to the same location. If one side reads from a location while the other side is writing to the same location, then either the reader or writer will see the buffer in a less-available state, and will end his cycle. The different cycle lengths and times will lead however, to situations where one side is ready for transfer, but the other side is not, leading to a delay of 1 cycle.

VMI Integration

Control signals are passed between the VXII system and the customer telephone system to which it is connected in either analog or digital format. Analog signals, referred to as in-band, use DTMF tones passed through the device's analog ports. Digital signals are passed through the device's serial communications ports.

Figure 3:
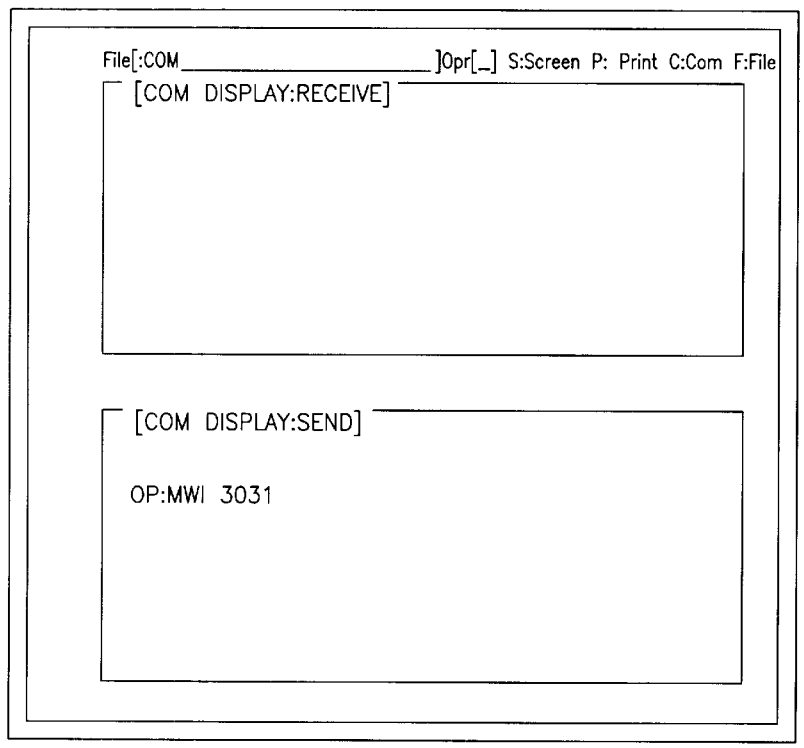
FIGS. 3 and 4 are exemplary representations of the browse screen according to an embodiment of the present invention.

The browse screens can be used to monitor inter-device communications taking place through the VXII system RS-232 or analog ports. When the browse screen is set for !COM (See. FIG. 3), it will display all incoming and outgoing communications on the RS-232 port. When set to !DIGITS (See FIG. 4), this screen displays all DTMF communications taking place over the system analog ports. These browse screens are used to check that system control signals contain the proper information.

Accessing the Browse Screen

The browse screen should be accessed using an On-Line Programming Menu. This allows communications to be monitored while the system is on-line and subscribers are sending and receiving messages. The following steps are an exemplary method for accessing the browse screen.

A. From the Run Dialogue screen, a function key is pressed (e.g., F8) to access the On-Line Programming Menu. The screen prompts: "Enter your access code [CMP####]." This access code is the three-character code shown in the company code field in the company screen, as well as the access code to the System Administrator mailbox. The System Administrator has the option to change the code.

B. Type in the access code, and press ENTER. The screen displays the On-Line Programming Menu.

C. Press Page Down to access page two of the On-Line Programming Menu.

D. From page two of the On-Line Programming Menu, press I to access the Browse screen.

E. Type '!COM' to monitor RS-232 communications, or '!DIGITS', to monitor DTMF communications in the File field, then press ENTER twice. The RS-232 browse screen (FIG. 3) or DTMF browse screen (FIG. 4) will be displayed.

F. When finished monitoring communications, press ESC twice to return to the On-Line Programming Menu or three times to return to the Run Dialogue screen.

On the RS-232 browse (!COM) screen, incoming serial communications are shown at the top of the screen and outgoing serial communications are shown at the bottom. The information is continuously updated as new information is sent or received. For example, an entry of 'OP:MWI3031' in the lower half of the screen indicates that a signal has been sent to the customer telephone system to turn on the message waiting indicator at extension 3031. Other examples of common serial communications packets and their meaning are given in table 3.

TABLE 3

| Packet Type | Typical Packet Content | Direction | Interpretation |
|---|---|---|---|
| MWI On | OP:MWI 3003! | From VXII | OP:MWI - MWI On<br>3003 - Extension Number |
| MWI Off | RMV:MWI 3003! | From VXII | RMV:MWI - MWI Off<br>3003 - Extension Number |
| Ring | MD0013057R | From IDS | MD001 - Message Desk Number<br>3057 - VMS Extension<br>R - Ring |
| Disconnect | MD0013057C | From IDS | MD001 - Message Desk Number<br>3057 - VMS Extension<br>C - Disconnect |
| Direct Call (VMS Key) | MD0013057M3003 | From IDS | MD001 - Message Desk Number |

TABLE 3-continued

| Packet Type | Typical Packet Content | Direction | Interpretation |
|---|---|---|---|
| Forward Call (Outside Caller) | MD0013057M3003 | From IDS | 3057 - VMS Extension<br>M - Mail box command<br>3003 - Mailbox of calling subscriber<br>MD001 - Message Desk Number<br>3057 - VMS Extension<br>M - Mail box command<br>3003 - Mailbox Number (non subscriber call) |
| Intercom Dial | I 3057 dddd! | From VXII | I - Intercom<br>3057 - VMS extension number<br>ddddd - digits<br>! - terminator |
| Flash | F 3057! | From VXII | F - Flash<br>3057 - VMS extension Number<br>! - terminator |
| Transfer to Operator | F 3057!<br>I 3057 O! | From VXII | F - Flash<br>3057 - VMS extension Number<br>! - terminator<br>I - Intercom dial<br>3057 - VMS Extension Number<br>0 - operator number<br>! - terminator*** |
| Transfer to Extension | F 3057!<br>I 3057 3003! | From VXII | F - Flash<br>3057 - VMS extension Number<br>! - terminator<br>I - Intercom dial<br>3057 - VMS Extension Number<br>3003 - transfer to extension 3003<br>! - terminator*** |
| Flash NAK | FLAS3057 INV | From IDS | This is a response to the Flash command.<br>FLSH - response to F command<br>3057 - VMS extension number<br>INV - IDS could not perform the flash |
| Destination is Busy | BUSY3057 | From IDS | This is a response to the Intercom command.<br>The destination extension which 3057 dialed is busy |
| Ring Back | RNGB3057 | From IDS | This is a response to the Intercom command.<br>The destination extension which 3057 dialed in ringing. |
| Reorder | RRDR3057 | From IDS | This is a response to the Intercom command.<br>The destination extension which 3057 dialed is illegal or in DND or not installed or NOT IN |
| Destination Answered | ANSR3057 | From IDS | is a response to the Intercom Command.<br>The destination extension which 3057 dialed answered the call |
| Invalid extension Number | DIAL3057 INV | From IDS | This is a response to the Intercom Command<br>DIAL - command responding to.<br>3057 - VMS extension Dialed<br>INV - Extension dialed is not valid |

***After the VXII sends this sequence, the VXII forces the voice mail port on extension 3057 to go on-hook. This causes the IDS to transfer the call from extension 3057 to the dialed extension.
Note: All messages from the IDS must start with the prefix ctrl_y followed by c/r followed by l/f and terminate with l/f followed by c/r followed by ctrl_y. And, all messages from the VXII must start with ctrl_d.

The "M" message generated by the IDS (e.g., Ring packet type) is sent to the VXII only when the VXII SLI port goes off hook as a result of receiving a call. The data which follows the M letter is in essence the same as the in-band DTMF tones signaling which follows the IDS programming of the "G" screen.

Figure 4:
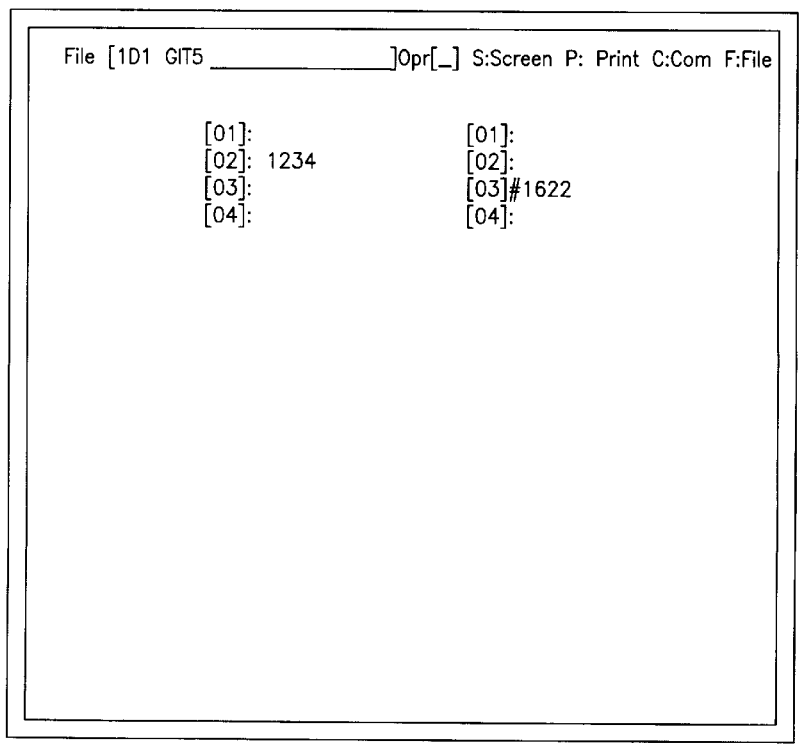

On the DTMF browse (!DIGITS) screen shown in FIG. 4, incoming DTMF digits are shown on the left side of the screen and outgoing DTMF digits are shown on the right. The port with which incoming and outgoing DTMF digits are associated is given within brackets. The information appearing next to each port number is continuously updated as new information is sent or received using that port. For example, an entry of '[02] 1234' on the left side of the screen indicates that the DTMF string "1234" was received using analog port 2. An entry of '[03]#1622' on the right side of the screen indicates that the DTMF string "#1622 was sent using analog port 3.

Interfacing the VxC with the IDS

The interface of the VxC with the IDS uses various commands via an integrated operator's terminal (IOT) and the DPR. When a VxC is installed at a customer's site, the installation generally requires the use of an external monitor and keyboard for configuration control and status monitoring. In order to reduce the cost of the installation, the external monitor and keyboard have been removed, and a PROGRAMMING TERMINAL is used to control the VxC. The PROGRAMMING TERMINAL can be the IOT or a personal computer (PC) running applicable communications packages.

Currently, personal computers use a memory mapped display to control the images on the screen. The PROGRAMMING TERMINAL uses a serial interface operating at a maximum of 9600 baud to display text and graphic characters. When the VxC information is routed to the IDS, the displays will be noticeably slower in operation. However, the operation of the VxC will not degrade due to the speed of the video information.

Another consideration is the size of the display itself. The display area of the PC CRT is 25 lines by 80 columns. The PROGRAMMING TERMINAL directly supports 24 lines by 80 columns. Since certain communications packages use the 25$^{th}$ line as a status line, it is a requirement that the VxC limit all screens to 24 lines by 80 columns.

The VxC must be controlled from either an Integrated Operator's Terminal (IOT) or from a PC running a communication package. In the case of the latter, the PC emulates a TVI-925 terminal. In view of the different control options for the VxC, several issues need to be considered:

1. Neither the PC nor the IOT will be able to send a keycode for a key modified by the ALT key. In the case of the IOT, there is no ALT key on the keyboard. In the case of the PC, the ALT key is used to access the communications package. Therefore, the VxC program must be modified to preclude the use of the ALT key in all cases.

2. A new DOS editor that does not require the use of the ALT key will be needed for field use. This editor will be used to modify DOS batch files for testing and installation purposes.
3. The PC sends different key codes for the Functions Keys as compared to the IOT. The VxC must be able to accept function keys codes from either device.
4. The keypad for the IOT is considered non-standard. Some of the keys normally used for communications functions will need to be reused for screen control. For example, the Pick key will have to double as a Page Up key.
5. There is a restriction on the use of control codes also. The IOT uses XON/XOFF as flow control for screen control. (If the terminal gets more data than it can handle, the terminal will send an XOFF until it has caught up with the processing. At that time, the terminal will send an XON.) For this reason, the user must NOT use CTRL-S or CTRL-Q as a menu selection.

As mentioned previously, the interface between the VxC and the IDS uses the dual port RAM for the display and control of the VxC. There are four areas in the dual port RAM dedicated to this function.
1. Keyboard Serial Data from IDS to PC contains the keycodes from the IDS.
2. Video Serial Data from PC to IDS contains the screen commands from the VxC.
3. IDS Command to VxC contains the command information from the IDS.
4. VxC Response to IDS contains response information from the VxC to the IDS.

The IDS acts as a conduit for the information between the PROGRAMMING TERMINAL and the VxC.

The PROGRAMMING TERMINAL is configured to act as a TVI-925/QUME 108 terminal. When the VxC sends video information to the IDS, the IDS will route this information directly to the terminal. Therefor, the VxC must format all commands to be compatible with the terminal. Likewise, any keystrokes from the terminal will be sent directly to the VxC.

The VxC will be required to not only send and receive information during the operation of the VXII application, but will also be required to work during DOS prompts and with other DOS applications.

The IDS Command to VxC and VxC Response to IDS buffers have been added to remedy the situation where the IDS resets, but the VxC does not perform a reset. In this case, both the VxC's and the IDS's pointers will be out of sync.

The Reset Operation command forces a re-synchronization of the IDS with the VxC in the event that the IDS resets. When the VxC sees this command, it will clear all of its internal interface pointers.

When the VxC resets, it will change its Card ID to 0xFF. The IDS monitors this location constantly. When the IDS detects that the VxC has reset, the IDS will perform and internal reset of the VxC application interface and will follow the standard initialization sequence with the VxC. At the beginning of a card reset, the VxC must maintain the Card ID value of 0xFF for a minimum of 50 ms before reverting back to the normal Card ID.

Initialization

After the VxC has placed a value of 0x07 into the Card ID location, the IDS will check the Driver Version String locations. If these locations contains an ASCIIZ string with up to 8 bytes starting with a 'V' and ending with a zero, the IDS knows that a VxC port card is installed in the system. First, the IDS will send a Reset Operation command in the IDS Command to the VxC buffer. The IDS will then send a Configure Terminal Operation command in the IDS Command to the VxC Buffer. The IDS will wait for approximately 5 minutes before assuming that the VxC is not responding to the Configure Terminal Operation command.

Figure 5:
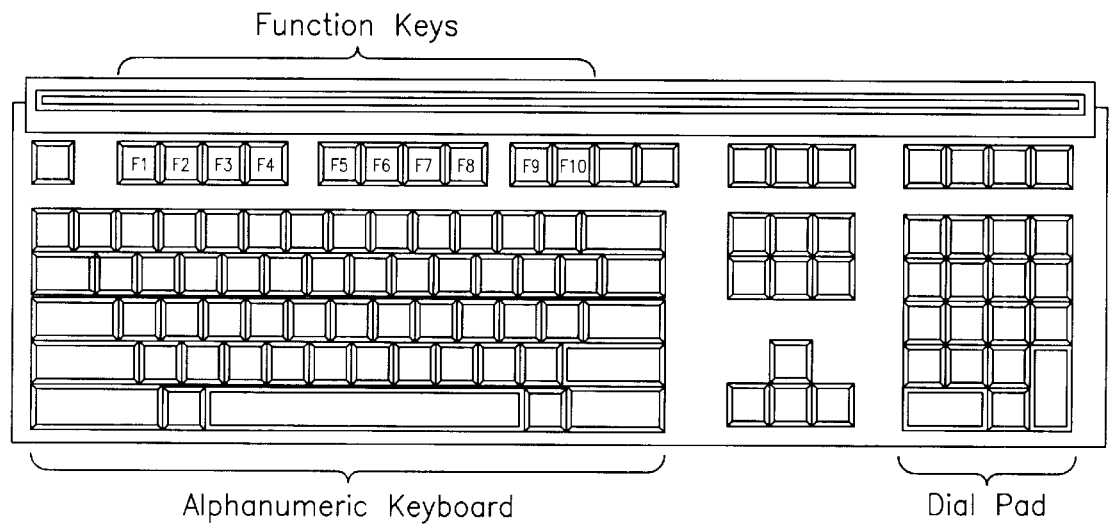
FIGS. 5 and 6 are illustrative representations of a keyboard used in the PC implementation of the present invention.
Figure 6:
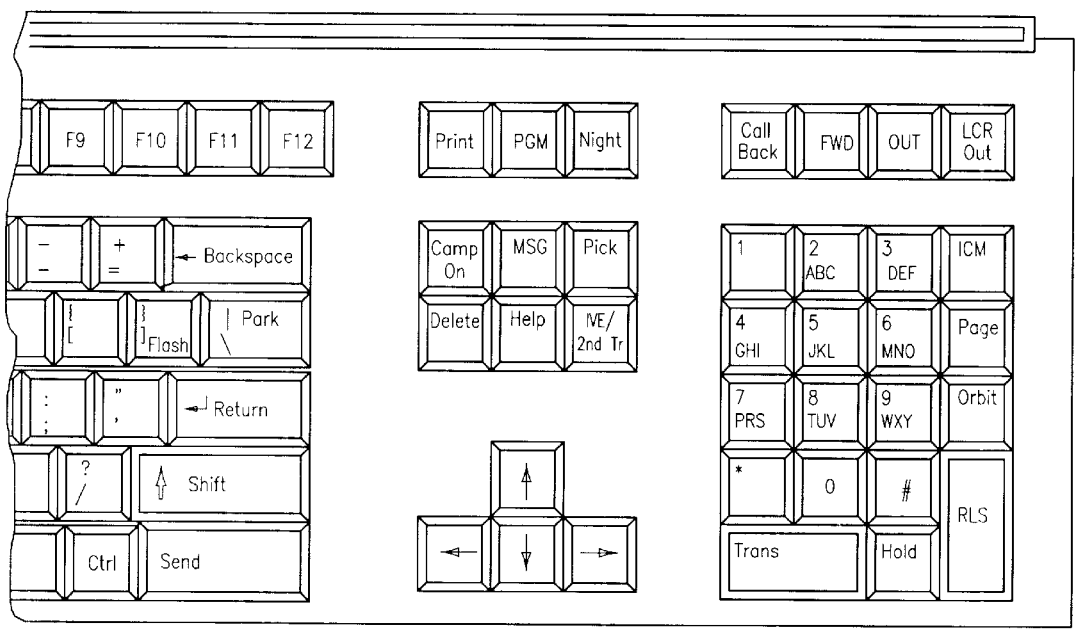

If the VxC responds with a Terminal Operation response in the VxC Response to IDS buffer, the IDS knows that control via the backplane is possible. At this point, the IDS will place a menu item on the Main Menu for VxC control. The user selects the menu item for VxC control to start a dialogue with the VxC. FIGS. 5 and 6 show examples of the keyboard that is used for the IOT. The standard part of the keyboard sends 7 bit US ACSII Codes when a key is pressed as per the following table.

TABLE 4

| b4 | b3 | b2 | b1 | | b7 b6 b5 | 0 0 0 | 0 0 1 | 0 1 0 | 0 1 1 | 1 0 0 | 1 0 1 | 1 1 0 | 1 1 1 |
|---|---|---|---|---|---|---|---|---|---|---|---|---|---|
| | | | | | | 0 | 1 | 2 | 3 | 4 | 5 | 6 | 7 |
| 0 | 0 | 0 | 0 | 0 | | nul | dle | sp | 0 | @ | P | ` | p |
| 0 | 0 | 0 | 1 | 1 | | soh | d1 | ! | 1 | A | Q | a | q |
| 0 | 0 | 1 | 0 | 2 | | stx | dc2 | " | 2 | B | R | b | r |
| 0 | 0 | 1 | 1 | 3 | | etx | dc3 | # | 3 | C | S | c | s |
| 0 | 1 | 0 | 0 | 4 | | eot | dc4 | $ | 4 | D | T | d | t |
| 0 | 1 | 0 | 1 | 5 | | enq | nak | % | 5 | E | U | e | u |
| 0 | 1 | 1 | 0 | 6 | | ack | syn | & | 6 | F | V | f | v |
| 0 | 1 | 1 | 1 | 7 | | bel | etb | ' | 7 | G | W | g | w |
| 1 | 0 | 0 | 0 | 8 | | bs | can | ( | 8 | H | X | h | x |
| 1 | 0 | 0 | 1 | 9 | | ht | em | ) | 9 | I | Y | i | y |
| 1 | 0 | 1 | 0 | A | | lf | sub | * | : | J | Z | j | z |
| 1 | 0 | 1 | 1 | B | | vt | esc | + | ; | K | [ | k | { |
| 1 | 1 | 0 | 0 | C | | ff | fs | , | < | L | \ | 1 | \| |
| 1 | 1 | 0 | 1 | D | | cr | gs | - | = | M | ] | m | } |
| 1 | 1 | 1 | 0 | E | | s0 | rs | . | > | N | | n | ~ |
| 1 | 1 | 1 | 1 | F | | si | us | / | ? | O | _ | o | del |

The following table 5 shows the key codes for the non-standard key caps and for the commands used for VxC operation:

TABLE 5

| Key Cap | IOT Key Code | Hex Code |
|---|---|---|
| F1 | '>'0x01 | 3E 01 |
| F2 | '>'0x02 | 3E 02 |
| F3 | '>'0x03 | 3E 03 |
| F4 | '>'0x04 | 3E 04 |
| F5 | '>'0x05 | 3E 05 |
| F6 | '>'0x06 | 3E 06 |
| F7 | '>'0x07 | 3E 07 |
| F8 | '>'0x08 | 3E 08 |
| F9 | '>'0x09 | 3E 09 |
| F10 | '>'0x0A | 3E 0A |
| F11 | '>'0x0B | 3E 0B |
| F12 | '>'0x0C | 3E 0C |
| Print | Does not generate a code | |
| PGM | '>'0x20 | 3E 20 |
| Night | 0x12 | 12 |
| Call Back | 0x7B | 7B |
| FWD | '>'0x21 | 3E 21 |
| Out | 0x14 | 14 |
| LCR Out | 0x15 | 15 |
| Camp On | 0x19 | 19 |
| MSG | 0x18 | 18 |
| Pick | 0x3D | 3D |
| Delete | 0x7F | 7F |
| Help | Does not generate a code | |
| IVIE/2ND Tr | 0x2B | 3B |
| 1 | 0x31 | 31 |
| 2/ABC | 0x32 | 32 |
| 3/DEF | 0x33 | 33 |

TABLE 5-continued

| Key Cap | IOT Key Code | Hex Code |
|---|---|---|
| ICM | 0x0C | 0C |
| 4/GHI | 0x34 | 34 |
| 5/JKL | 0x35 | 35 |
| 6/MNO | 0x36 | 36 |
| Page | 0x2E | 2E |
| 7/PRS | 0x37 | 37 |
| 8/TUV | 0x38 | 38 |
| 9/WXY | 0x39 | 39 |
| Orbit | 0x2C | 2C |
| * | 0x2A | 2A |
| 0 | 0x30 | 30 |
| # | 0x23 | 23 |
| RLS | 0x0D | 0D |
| Trans | 0x2D | 2D |
| Hold | 0x08 | 08 |
| Up Arrow | 0x0B | 0B |
| Left Arrow | 0x08 | 08 |
| Down Arrow | 0x16 | 16 |
| Right Arrow | 0x0C | 0C |
| }]Flash | 0x5D | 5D |
| |\Park | 0x5C | 5C |
| Return | 0x0D | 0D |
| Shift | Does not generate a code | |
| Ctrl | Does not generate a code | |
| Send | Does not generate a code | |

Note that the number of the key codes are programmed specifically for use with the IOT.

IOT Display Codes and Responses

The following section tabulates the specifications of the video terminal:

| | |
|---|---|
| Display format | 24 lines by 80 characters columns<br>25th Status/User Line |
| Character Formation | 7 × 9 Matrix in a 9 × 12 cell |
| Video Attributes | Blink, Blank, Underline, Normal/Reverse Video And Half Intensity |
| Cursor Type | Blink/Steady, Block/Underline, or Invisible |
| Fields | Protected and Unprotected Fields |
| Character Set | 96 US ASCII Character set<br>32 Control characters<br>15 graphics (line drawings) symbols |

Table 6 indicates the most used commands for the display.

TABLE 6

| Sequence | Hex Code | Video Command |
|---|---|---|
| esc Y | 1B 59 | home and clear screen |
| esc G 0 | 1B 47 30 | line normal video |
| esc G 1 | 1B 47 31 | blank video on |
| esc G 2 | 1B 47 32 | blink video on |
| esc G 4 | 1B 47 34 | line reverse video |
| esc G 6 | 1B 47 36 | reverse and blink video |
| esc G 8 | 1B 47 38 | underline video |
| esc G : | 1B 47 3A | blink and underline video |
| esc G < | 1B 47 3C | reverse and underline video |
| esc G > | 1B 47 3E | underline/reverse blink video |
| esc ) | 1B 29 | half intensity on |
| esc ( | 1B 28 | half intensity off |
| esc T | 1B 54 | line erase to spaces |
| esc . 0 | 1B 2E 30 | cursor off |
| esc . 1 | 1B 2E 31 | blinking block cursor |
| esc . 2 | 1B 2E 32 | steady block cursor |
| esc . 3 | 1B 2E 33 | blinking underline cursor |
| esc . 4 | 1B 2E 34 | steady underline cursor |

The "esc=RC" command allows the cursor to be located at a specific row (line) and column position on the page. In this escape sequence, R equals the ASCII row or line equivalent, and C equals the ASCII column equivalent as per the following table 7.

TABLE 7

| LINE | | COLUMN | |
|---|---|---|---|
| Line # Char | Col # Char | Col # Char | Col # Char |
| 1 space | 1 space | 28 ; | 55 V |
| 2 ! | 2 ! | 29 < | 56 W |
| 3 " | 3 " | 30 = | 57 X |
| 4 # | 4 # | 31 > | 58 Y |
| 5 $ | 5 $ | 32 ? | 59 Z |
| 6 % | 6 % | 33 @ | 60 [ |
| 7 & | 7 & | 34 A | 61 \ |
| 8 ' | 8 ' | 35 B | 62 ] |
| 9 ( | 9 ( | 36 C | 63 |
| 10 ) | 10 ) | 37 D | 64 _ |
| 11 * | 11 * | 38 E | 65 |
| 12 + | 12 + | 39 F | 66 a |
| 13 , | 13 , | 40 G | 67 b |
| 14 - | 14 - | 41 H | 68 c |
| 15 . | 15 . | 42 I | 69 d |
| 16 / | 16 / | 43 J | 70 e |
| 17 0 | 17 0 | 44 K | 71 f |
| 18 1 | 18 1 | 45 L | 72 g |
| 19 2 | 19 2 | 46 M | 73 h |
| 20 3 | 20 3 | 47 N | 74 I |
| 21 4 | 21 4 | 48 O | 75 j |
| 22 5 | 22 5 | 49 P | 76 k |
| 23 6 | 23 6 | 50 Q | 77 l |
| 24 7 | 24 7 | 51 R | 78 m |
| | 25 8 | 52 S | 79 n |
| | 26 9 | 53 T | 80 o |
| | 27 : | 54 U | |

The graphics mode is a special applications feature that reconfigures the terminal for 15 line drawings symbols. Graphics mode is enabled by using the "esc $" command sequence, and is disabled by using the "esc %" command sequence. The following table 8 lists the special graphics mode characters:

TABLE 8

| Key Code | Hex Code | Graphics Character |
|---|---|---|
| A | 41 | ⌊ |
| B | 42 | ⌈ |
| C | 43 | ⌉ |
| D | 44 | ⌋ |
| E | 45 | ├ |
| F | 46 | ┌ |
| G | 47 | ┐ |
| H | 48 | ┘ |

TABLE 8-continued

| Key Code | Hex Code | Graphics Character |
|---|---|---|
| I | 49 | |
| J | 4A | |
| K | 4B | |
| L | 4C | |
| M | 4D | |
| N | 4E | |
| O | 4F | |

Table 9 lists the codes that go into the IDS Command to VxC Buffer.

TABLE 9

| Command | Hex Code |
|---|---|
| Reset Operation | 0xFF |
| Configure Terminal Operation | 0x01 |
| Start Operation | 0x02 |
| Force End | 0x03 |

The next table 10 lists the codes that go into the VxC Response to IDS Buffer:

TABLE 10

| Response | Hex Code |
|---|---|
| Terminal Operation | 0x01 |
| End Operation | 0x02 |

PC Keycodes

Small systems such as, for example, Executone Information Systems, Inc.'s System 84, can be installed without an operator terminal or a programming terminal. For these systems, a technician would use a laptop running a communication package, such as, for example, Procomm+, to perform system administration. The technician would configure the communications package to emulate a TVI-925. The display control commands would be the same for the IOT and the TVI-925 emulation. The standard keyboard mapping does not match the keycodes used by the IOT. Therefore, the VxC program must be able to interpret keycodes from either the IOT or the PC emulating the TVI-925.

The following tables list the keycodes generated by a standard TVI-925 keyboard. The standard part of the keyboard sends 7 bit US ASCII Codes when a key is pressed as per table 11:

TABLE 11

| b4 | b3 | b2 | b1 | b7=0 b6=0 b5=0 / 0 | b7=0 b6=0 b5=1 / 1 | b7=0 b6=1 b5=0 / 2 | b7=0 b6=1 b5=1 / 3 | b7=1 b6=0 b5=0 / 4 | b7=1 b6=0 b5=1 / 5 | b7=1 b6=1 b5=0 / 6 | b7=1 b6=1 b5=1 / 7 |
|---|---|---|---|---|---|---|---|---|---|---|---|
| 0 | 0 | 0 | 0 | nul | dle | sp | 0 | @ | P | ` | p |
| 0 | 0 | 0 | 1 | soh | d1 | ! | 1 | A | Q | a | q |
| 0 | 0 | 1 | 0 | stx | dc2 | " | 2 | B | R | b | r |
| 0 | 0 | 1 | 1 | etx | dc3 | # | 3 | C | S | c | s |
| 0 | 1 | 0 | 0 | eot | dc4 | $ | 4 | D | T | d | t |
| 0 | 1 | 0 | 1 | enq | nak | % | 5 | E | U | e | u |
| 0 | 1 | 1 | 0 | ack | syn | & | 6 | F | V | f | v |
| 0 | 1 | 1 | 1 | bel | etb | ' | 7 | G | W | g | w |
| 1 | 0 | 0 | 0 | bs | can | ( | 8 | H | X | h | x |
| 1 | 0 | 0 | 1 | ht | em | ) | 9 | I | Y | I | y |
| 1 | 0 | 1 | 0 | lf | sub | * | : | J | Z | j | z |
| 1 | 0 | 1 | 1 | vt | esc | + | ; | K | [ | k | { |
| 1 | 1 | 0 | 0 | ff | fs | , | < | L | \ | l | \| |
| 1 | 1 | 0 | 1 | cr | gs | - | = | M | ] | m | } |
| 1 | 1 | 1 | 0 | so | rs | . | > | N | | n | ~ |
| 1 | 1 | 1 | 1 | si | us | / | ? | O | _ | o | del |

The following table 12 shows the key codes for the non-standard key caps and for the commands used for VxC operation:

TABLE 12

| Key Cap | TVI-925 Key Code | Hex Value |
|---|---|---|
| F1 | Ctrl-A @ CR | 01 40 0D |
| F2 | Ctrl-A A CR | 01 41 0D |
| F3 | Ctrl-A B CR | 01 42 0D |
| F4 | Ctrl-A C CR | 01 43 0D |
| F5 | Ctrl-A D CR | 01 44 0D |
| F6 | Ctrl-A E CR | 01 45 0D |
| F7 | Ctrl-A F CR | 01 46 0D |
| F8 | Ctrl-A G CR | 01 47 0D |
| F9 | Ctrl-A H CR | 01 48 0D |
| F10 | Ctrl-A I CR | 01 49 0D |
| F11 | Ctrl-A J CR | 01 4A 0D |
| F12 | Ctrl-A K CR | 01 4B 0D |
| Shift F1 | Ctrl-A ` CR | 01 60 0D |
| Shift F2 | Ctrl-A a CR | 01 61 0D |
| Shift F3 | Ctrl-A b CR | 01 62 0D |
| Shift F4 | Ctrl-A c CR | 01 63 0D |
| Shift F5 | Ctrl-A d CR | 01 64 0D |
| Shift F6 | Ctrl-A e CR | 01 65 0D |
| Shift F7 | Ctrl-A f CR | 01 66 0D |
| Shift F8 | Ctrl-A g CR | 01 67 0D |
| Shift F9 | Ctrl-A h CR | 01 68 0D |
| Shift F10 | Ctrl-A I CR | 01 69 0D |
| Shift F11 | Ctrl-A j CR | 01 6A 0D |
| Shift F12 | Ctrl-A k CR | 01 6B 0D |
| Insert | ESC Q | 1B 51 |
| Delete | ESC W | 1B 57 |
| Home | Ctrl-^ | 1E |
| End | ESC T | 1B 54 |
| Page Up** | ESC K | 1B 4B |
| Page Down** | ESC J | 1B 4A |
| Up Arrow | Ctrl-K | 0B |
| Left Arrow | Ctrl-H | 08 |
| Down Arrow | Ctrl-V | 16 |
| Right Arrow | Ctrl-L | 0C |

**Note: Page Up and Page Down do not have default entries for the Procomm+ communications package. These codes must be entered for the keys.

If the IDS is reset at any time while the Vxc is not running, the user will be required to enter the system through the programming terminal and restart the voice mail system application. If, however, the VxC is shutdown or removed from the IDS, the IDS will return to the main menu to enable further configuration or operations by the operator.

It should be understood that the present invention is not limited to the particular embodiment disclosed herein as the best mode contemplated for carrying out the present invention, but rather that the present invention is not limited to the specific embodiments described in this specification except as defined in the appended claims.

We claim:

1. A method for integrating a voice mail/messaging system into a public branch exchange (PBX) telephone system comprising the steps of:
   providing a voice messaging card (VxC) for connection to a communication backplane of the PBX telephone system;
   dedicating a parallel communication interface on said voice messaging card for providing parallel communications between said voice messaging card and said PBX system;
   establishing two-way communication between the voice messaging card and the PBX telephone system over the PBX backplane via the dedicated parallel communication interface; and
   controlling the voice messaging card to provide voice mail functions to users of the PBX telephone system.

2. The method according to claim 1, wherein said step of dedicating a communication interface further comprises the step of providing a random access memory (RAM) in the communication interface.

3. The method according to claim 2, wherein said step of dedicating further comprises the step of allocating a plurality of memory locations within the RAM for handling a plurality of communications between the voice messaging card, the PBX and a controller.

4. The method according to claim 1, wherein said step of establishing further comprises the steps of:
   initializing the PBX to recognize the presence of the voice messaging card connected to the backplane; and
   initializing the voice messaging card to communicate over the backplane with the PBX.

5. The method according to claim 1, wherein said step of controlling is performed by a personal computer connected to a serial port of the voice messaging card.

6. The method according to claim 1, wherein said step of controlling is performed by an integrated operator terminal (IOT) connected to a serial port of the voice messaging card.

7. The method according to claim 1, wherein said step of establishing further comprises the step of allocating a plurality of buffers in the PBX system and the voice messaging card, each of said plurality of buffers being dedicated for use in different aspects of communication between the PBX and voice messaging card.

8. The method according to claim 1, wherein said step of controlling further comprises the steps of:
   monitoring inter device communication between the PBX and voice messaging card; and
   providing a real-time visual display to an operator of the inter-device communication.

9. The method according to claim 4, wherein said steps of initializing further comprises the steps of:
   establishing a voice messaging card ID for identification by the PBX;
   checking driver string locations in the voice messaging card RAM;
   sending a reset command to the voice messaging card from the PBX;
   sending a configure terminal command to the voice messaging card from the PBX; and
   sending a terminal operation response to the PBX from the voice messaging card.

10. A method for integrating a voice mail/messaging system into a public branch exchange (PBX) telephone system comprising the steps of:
    providing a communication interface on a voice mail card connected to a parallel interface of a communication backplane of the PBX;
    initializing the PBX to recognize the presence of the voice mail card;
    establishing two-way communication between the recognized voice mail card and the PBX over the PBX backplane via the communication interface; and
    controlling the recognized voice mail card to provide voice mail functions to users of the PBX telephone system.

11. The method according to claim 10, wherein said step of providing a communication interface further comprises the step of providing a dual port random access memory (RAM) in the communication interface.

12. The method according to claim 10, further comprising the steps of:
    allocating a plurality of memory locations within the dual port RAM for handling a plurality of communications between the voice mail card and the PBX;
    allocating at least one buffer in the PBX system and voice mail card for use in the plurality of communications between the voice mail card and the PBX; and
    controlling the voice mail card to provide voice mail functions to the users of the PBX telephone system.

13. The method according to claim 12, wherein said step of controlling further comprises the steps of:
    configuring the voice mail card to operate according to desired applications;
    monitoring inter device communication between the PBX and the voice mail card; and
    providing a real time visual display to an operator of the monitored communication.

14. The method according to claim 10, wherein said step of initializing further comprises the steps of:
    establishing a voice mail card ID for identification by the PBX;
    checking driver string locations in the dual port RAM;
    sending a reset command to the voice mail card from the PBX;
    sending a configure terminal command to the voice mail card from the PBX; and
    sending a terminal operation response to the PBX from the voice mail card.

15. The method according to claim 13, wherein said step of controlling is performed by a personal computer connected to a serial port of the voice mail card.

16. The method according to claim 13, wherein said step of controlling is performed by an integrated operator terminal (IOT) connected to a serial port of the voice mail card.

17. The method according to claim 14, wherein said reset command and configure terminal command are sent to a buffer in the voice mail card using a PBX command.

18. The method according to claim 14, wherein said terminal operation response is sent to a buffer in the PBX.

* * * * *